Patented Jan. 18, 1938

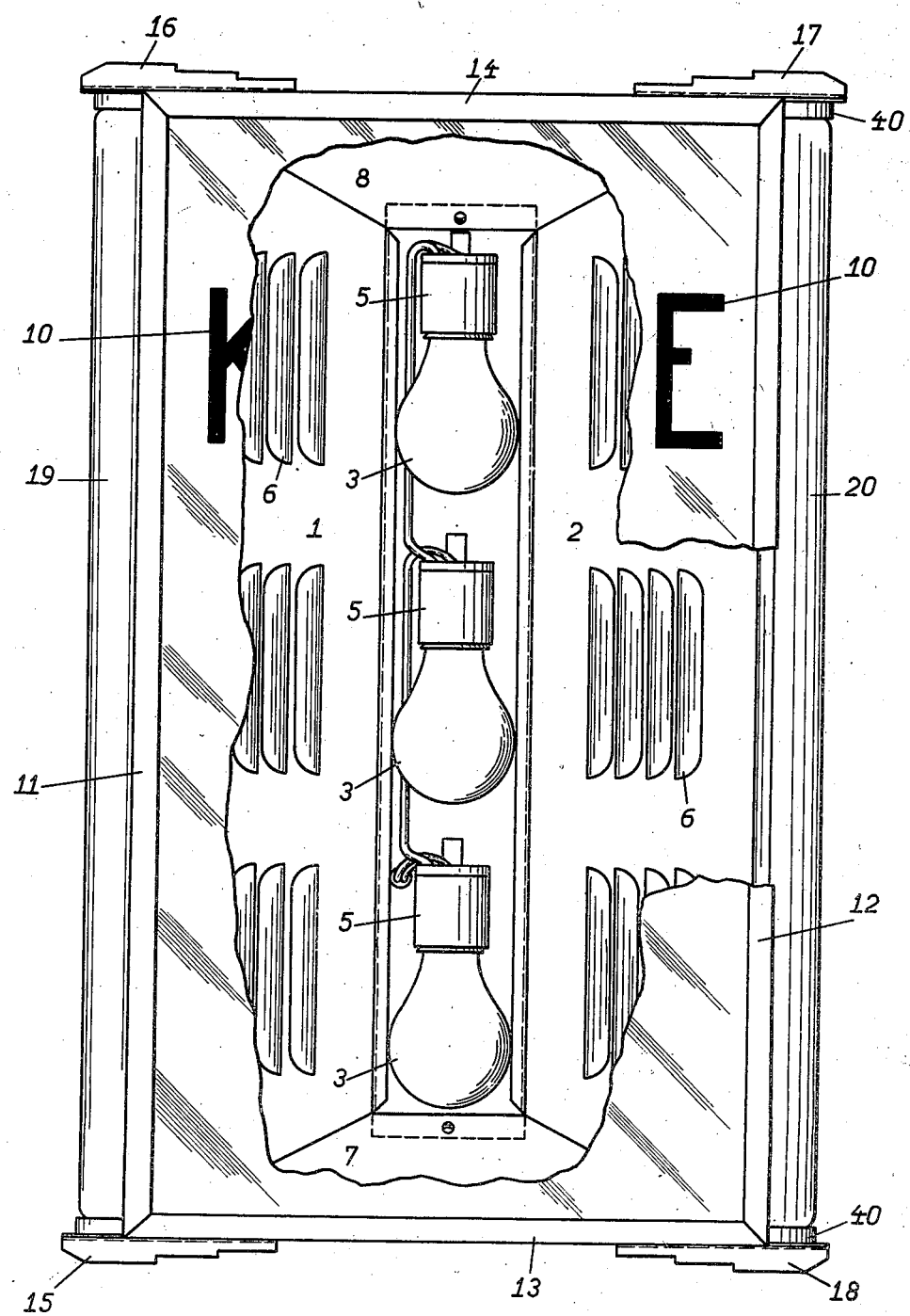

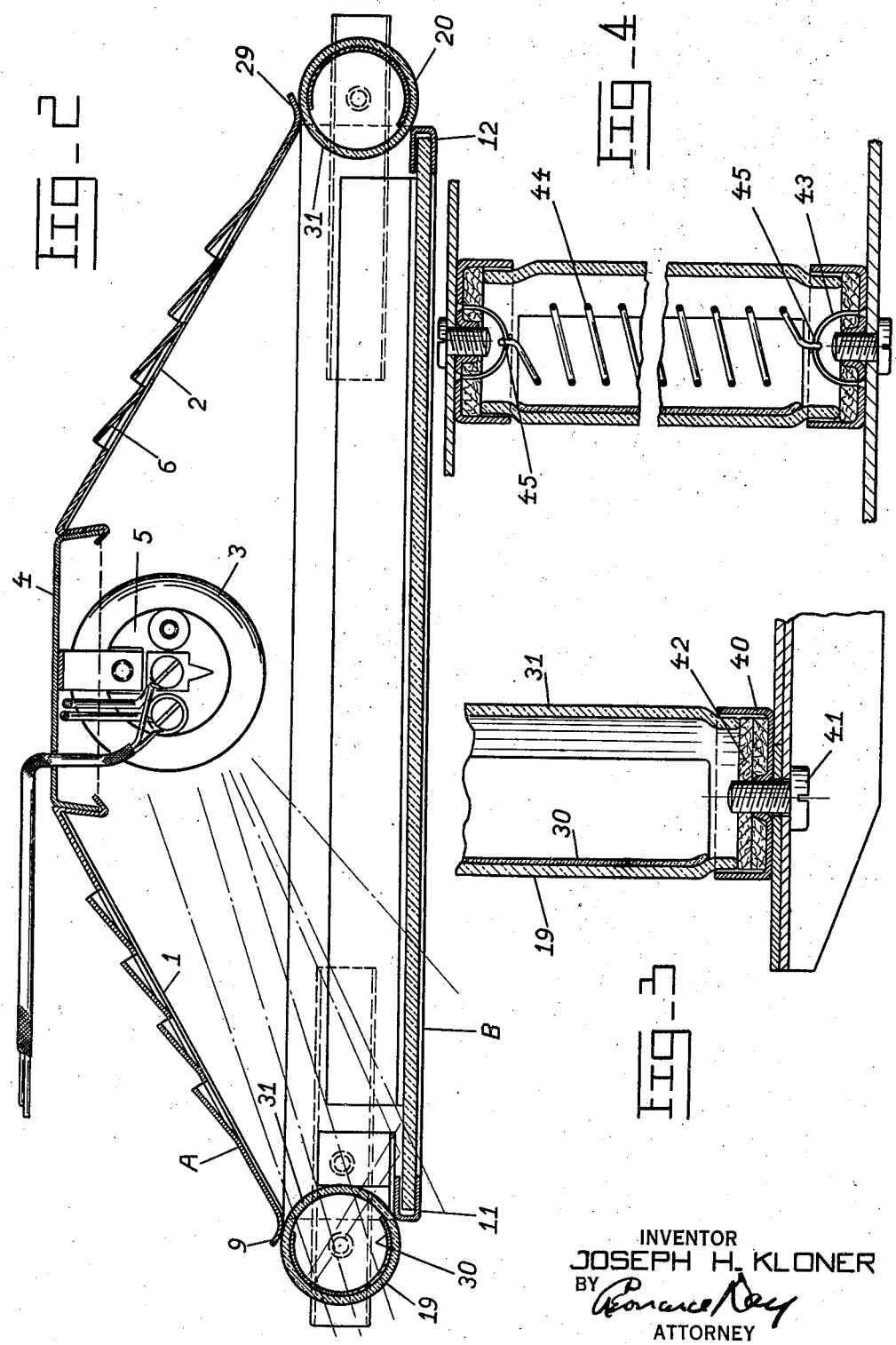

2,106,031

UNITED STATES PATENT OFFICE 2,106,031

PSEUDO NEON SIGN

Joseph Harris Kloner, Brooklyn, N. Y.

Application March 11, 1937, Serial No. 130,313

4 Claims. (Cl. 40—132)

This invention relates to signs and has as its principal object to produce an effective illuminated sign at low cost. In this connection, it is an objective to give the semblance of a sign illuminated with neon or similar gas glow tubes, whereas the illumination actually is derived from a filamentary type bulb.

A further object of the invention is to provide and effect the illumination of a display plate bearing advertising and in addition to make a display association with the display plate of pseudo neon glow tubes.

In carrying out the objective it is purposed to employ open ended white transparent glass tubes cut to suitable length without requiring the employment of a glass blower. These tubes may have inserted therein an elongated sheet or strip of cellulose acetate or even translucent paper, which is colored or tinted appropriately to simulate the characteristic glow tube which is being simulated. This strip extends co-axially, preferably the full extent of each glass tube, but does not cover the entire circumference, permitting thereby a window portion through which ordinary white light from an incandescent lamp may project to effect a substantial uniform glow of the strip. It is even contemplated that suitable paint may take the place of the colored strip.

It is further contemplated objectively to impart pleasing designs or advertising configurations to the lighting of the pseudo glow tubes. One preferred means and method of accomplishing this is by the simple insertion of an axially positioned spiral spring mounted in tension.

A further object of the invention is to provide a combined reflector and mounting box for the advertising panel and to mount incandescent lamp tube cooperatively with both the pseudo glow tubes and the advertising panel.

The above and further objects of the invention may better be understood by reference to the illustrative embodiment of the invention described in the following specification in connection with the accompanying drawings, although this illustrative embodiment is set forth to explain the claims and not in limitation thereof.

In the various figures, Fig. 1 is a front elevation of the sign as adapted to be viewed by the public, but with parts broken away;

Fig. 2 is a horizontal section drawn to an enlarged scale;

Fig. 3 is a fractional cross section of the tube mounting and

Fig. 4 is a fractional cross section of a modification of the tube mounting and construction showing a combination of means for imparting varied optical effects.

A suitable sheet metal frame A is fabricated to provide preferably a structure which is symmetrical about a vertical central plane so that inclined faces 1 and 2 serve as suitable reflectors for and distributors of the light for a plurality of incandescent lamps 3 suitably mounted to the back 4 by sockets 5. Ventilating strike outs 6 are preferably provided although it is preferred that all the internally exposed surfaces of the metal structure be plated for purposes of reflection and both bottom wall 7 and top wall 8 be inclined to aid in the forward reflection and distribution of the light upon and through a front panel B of transparent material, one surface, preferably the front surface, of which may have formed thereon advertising configurations 10. Metal framing strips 11, 12, 13 and 14, may serve to mount the panel beam and it is preferred that corner extensions 15, 16, 17 and 18 be provided to serve as mounts for lengths 19 and 20 of the transparent glass tube. One method of mounting this tubing is to face it up against the edges of the frame strips 11 and flaring lip 9 of the main frame for the tube 19 and similarly that the tube 20 between the strip 12 and the lip 29. Within each tube throughout its visible extent is inserted a strip 30, preferably of cellulose acetate colored to approximate the characteristic color of a neon tube. This strip is rolled into cylindrical contour before insertion and its own resilience tends to hold it against the inner walls of the tube. An elemental portion 31 for each glass tube is left uncovered for the embodiment illustrated to permit light from the incandescent lamps 3 to enter and internally illuminate the cellulose acetate strips so that from the exterior the glass tubes simulate neon tubes.

It has been found that stamped metal caps 40, 40 centrally threaded to take a machine screw 41 and provided with cushioning washers 42, are efficient and cheap for mounting the tubes. It is also feasible to fix a bail 43 to extend internally from a cap and serve as a mounting for tension spiral spring 44, the ends 45 of which may be hooked over the bail 43 to effect an axial positioning. These springs are preferably shiny and may be plated to reflect light. Their effect upon the tube is to give a pleasing mottled design. In fact any other configuration to this spring structure may be embodied to vary the design of the mottling.

What I claim and desire to secure by United States Letters Patent is:

1. An advertising sign comprising a panel of transparent material bearing on one of its faces advertising configurations; a frame having parts embracing said panel to mount the same; one or more glass tubes held by said frame in position at the edges of said panel; characteristically colored translucent means partially covering a surface of each of said tubes but leaving a limited elemental portion of each said tube unobscured; and one or more incandescent electric lamp sources of light illuminatingly associated with said one or more tubes and panel to effect the combined illumination of said one or more tubes and panel, with some light rays passing through the said elemental portion of each tube, transforming each said tube into a pseudo neon tube and illuminating said advertising configurations.

2. A box like frame having means for mounting one or more incandescent lamps therein, framing means for mounting a front panel of transparent material adapted to bear an advertising configuration on one of its faces; a pair of glass tubes mounted along the margins of said panel; translucent means covering a portion of each said glass tube visible from an observer's position but leaving elemental portions of said tubes on the side towards said lamps free for the passage of light rays into and out of the interior of said tubes.

3. An advertising device comprising a light transmitting panel having insignia thereon, a frame member comprising reflecting portions for the support thereof, and illuminating means cooperating with said reflector and with said panel for the illumination of said insignia and tube members having characteristic color members therein mounted adjacent said panel and said illuminant adapted to receive illumination therefrom and simulate glow discharge tubes.

4. An advertising sign device comprising an illuminable panel, a source of illumination therefor, and a plurality of glass tube members illuminably associated with said illuminant, said tubes being arranged in a characteristic configuration, and containing a light coloring material of the characteristic color over the portion of said tube towards an observer, but having clear glass over a portion adjacent said illuminant.

JOSEPH HARRIS KLONER.